United States Patent [19]

Patterson et al.

[11] Patent Number: 4,879,907

[45] Date of Patent: Nov. 14, 1989

[54] SOAP FILM FLOWMETER

[75] Inventors: Dwight Patterson, Fairfield; Neil A. Levine, Davis, both of Calif.

[73] Assignee: Humonics, Inc., Fairfield, Calif.

[21] Appl. No.: 14,577

[22] Filed: Feb. 13, 1987

[51] Int. Cl.$^4$ ............................................. G01F 1/708
[52] U.S. Cl. ................................................. 73/861.05
[58] Field of Search ............................. 73/861.05, 198

[56] References Cited

U.S. PATENT DOCUMENTS

| | | | |
|---|---|---|---|
| 3,248,941 | 5/1966 | McArthur | 73/861.05 |
| 3,277,707 | 10/1966 | Rodel | 73/861.05 |
| 3,308,660 | 3/1967 | Ford | 73/861.05 |
| 3,323,362 | 6/1967 | Wells | 73/861.05 |
| 3,403,555 | 10/1968 | Versaci et al. | 73/861.05 |
| 3,592,057 | 7/1971 | Boe et al. | 73/861.05 |
| 3,693,436 | 9/1972 | Gildner | 73/861.05 |
| 3,815,414 | 6/1974 | Hellstrom | 73/861.05 |
| 4,691,577 | 9/1987 | Lalin et al. | 73/861.05 |
| 4,762,004 | 8/1988 | Lalin et al. | 73/861.05 |

FOREIGN PATENT DOCUMENTS

| | | |
|---|---|---|
| 831610 | 2/1952 | Fed. Rep. of Germany . |
| 143823 | 9/1980 | German Democratic Rep. . |
| 56-40717 | 4/1981 | Japan . |
| 1417161 | 12/1975 | United Kingdom . |
| 2092742 | 8/1982 | United Kingdom ............. 73/861.05 |

OTHER PUBLICATIONS

"An Improved Design for Soap—Bubble Flow Meters" by LaHue et al., Dec. 1973.
"An Automatic Recording Bubble Flowmeter" by Nash et al., Dec. 1976.

Primary Examiner—Herbert Goldstein
Attorney, Agent, or Firm—Townsend & Townsend

[57] ABSTRACT

A soap film type gas flowmeter has an inverted U-shaped gas flow tube adjustably mounted in a sensor assembly. The inverted attitude of the gas flow tube prevents backflow of the soap film solution down to the sensor assembly and prevents diffusion of a heavier gas than the gas whose flow is being measured into the gas flow tube, thereby eliminating diffusion of a lighter gas through the soap film during measurement. The adjustable mounting of the gas flow tube enables optimum operation of the flowmeter for widely ranging gas flow rates. The glass flow tube is made from mandrel drawn glass to ensure high accuracy, which allows interchangeability from flowmeter to flowmeter with no change in accuracy.

12 Claims, 2 Drawing Sheets

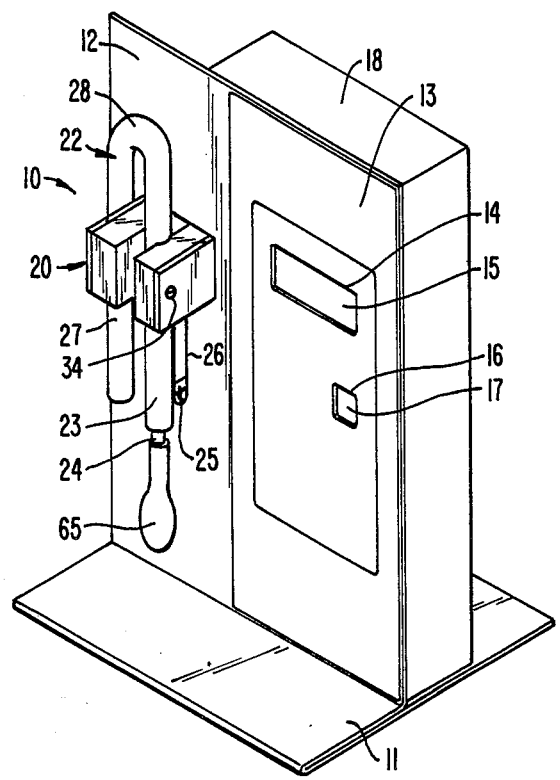
FIG._1.
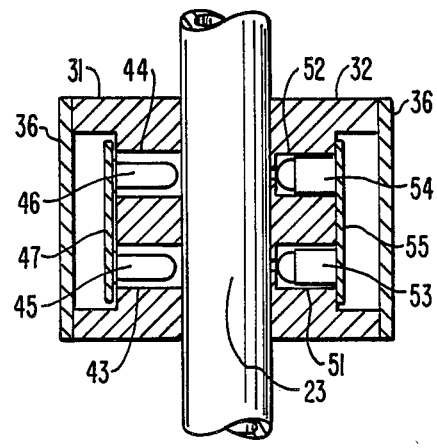
FIG._3.
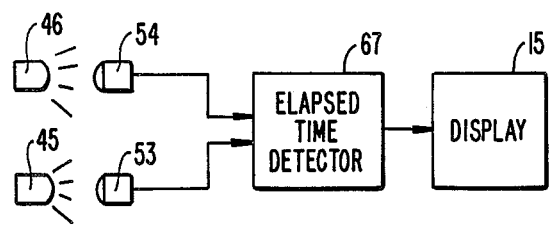
FIG._4.

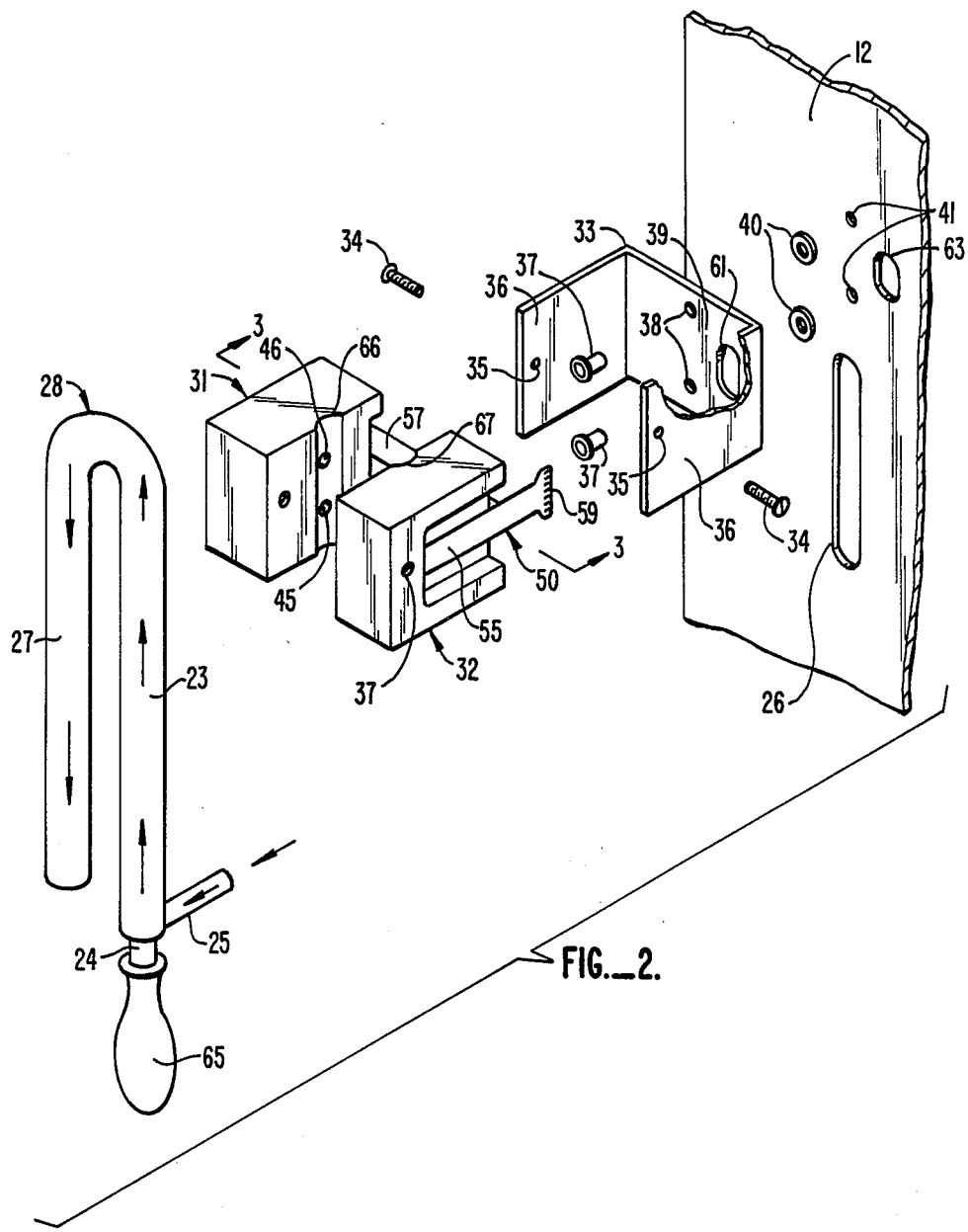
FIG._2.

SOAP FILM FLOWMETER

BACKGROUND OF THE INVENTION

This invention relates to gas flow measuring devices. More specifically, this invention relates to gas flow measuring devices of the soap film type.

Soap film type gas flowmeters are known and are typically used to measure the flow rate of gases in many applications, such as gas chromatography, leak detection, laboratory analyzers, and calibration of flow devices. Generally, a soap film type gas flowmeter includes a vertically extending flow tube of known diameter with an inlet near the bottom connected to the source of gas whose flow rate is to be measured. Also at the lower end of the flow tube is an arrangement for forming a soap film or bubble which can travel upwardly through the tube. The film forming arrangement is usually manually operable, and typically comprises a squeeze bulb containing a soapy solution. The gas entering the inlet flows upwardly through the tube and carries the film upwardly therethrough. At opposite ends of a measured length of the flow tube there are mounted respective detecting devices which detect the passage of the soap film thereby, and produce an electrical signal in response thereto. These signals are coupled to a timing device which measures the time required for the film to travel from one detecting device to the other. This time measurement determines the flow rate of the gas, which is then typically displayed in an analog or digital fashion.

Known gas flowmeters of the soap film type suffer from several disadvantages. Firstly, during use the soap film solution frequently accumulates at the top of the flow tube around the outlet, and flows down the outside of the tube into the detecting region, which causes contamination of the detecting devices and causes inaccurate measurements to be obtained. In addition, the detecting devices are usually fixed at a predetermined distance from the source of the soap film in the tube. For relatively slow flow rates, the transit time of the soap film from its point of origin to the first detector may be so long that the measuring instrument is annoyingly slow. This problem is exacerbated when several measurements are to be taken to ensure that the source is adjusted to the proper flow rate.

Perhaps more importantly, however, when measuring the flow rate of relatively light gases, such as helium or hydrogen, the heavier ambient air diffuses down into the gas flow tube to the emerging soap film. This creates a pressure differential on opposite sides of the soap bubble, causing some of the lighter gas to diffuse through the soap film. This phenomenon results in flow measurement errors, which cannot readily be accounted for and which are extremely undesirable.

An additional problem with known gas flowmeters lies in the relatively coarse tolerances used to manufacture the flow tube, which is usually made from glass. In known flowmeters, the device is typically calibrated at the factory using the original tube. When the tube is later damaged or destroyed in use, the entire meter must normally be returned to the factory, so that the device can be recalibrated with a new tube. This procedure is time consuming and inconvenient.

Efforts to devise a soap film type gas flowmeter devoid of the above disadvantages have not been successful to date.

SUMMARY OF THE INVENTION

The invention comprises a soap film type gas flowmeter which eliminates the back diffusion of air into the gas flow tube, prevents back flow of the soap film solution down the flow tube into the detecting region, provides an adjustable separation distance between the detecting region and the film forming location and uses a precision drawn glass tube which is interchangeable without requiring recalibration.

From an apparatus standpoint, the invention comprises a sensor assembly carried by an upstanding wall member having an elongated opening. The sensor assembly preferably includes a U-shaped support bracket centered about the elongated opening and a pair of sensor block members secured to the support bracket in facing relation. Each of the pair of sensor block members is provided with an inner surface having a vertically extending recess.

A U-shaped gas flow tube has a first downwardly directed leg adjustably received in the vertically extending recess of each of the pair of sensor block members. The tube has a second downwardly directed leg terminating in an open outlet, and a branch interconnecting the first and second legs. The U-shaped gas flow tube is thus adjustably mounted to the sensor in an inverted attitude. The first downwardly directed leg has a gas inlet portion extending through the elongated opening of the wall member and a fluid inlet portion located adjacent the gas inlet portion. Coupled to the fluid inlet portion of the first leg of the tube is a reservoir for introducing a soap film into the first leg in the region adjacent the gas inlet portion.

The gas flow tube is fabricated from a glass tube drawn on a precision ground mandrel, so that the dimensional accuracy of the inner diameter of at least the first leg is extremely precise - on the order of 0.15 percent. Consequently, a damaged or broken tube can be replaced with a new tube obtained from the manufacturer without requiring recalibration of the flowmeter.

In use, a soap film is introduced into the first leg of the tube adjacent the gas inlet portion and is swept by the gas upwardly along the first leg past the pair of sensor block members, along the interconnecting branch and downwardly along the second leg to the outlet of the gas flow tube. The inverted attitude of the U-shaped gas flow tube serves to retain lighter than air gases in the interior thereof, so that the pressure on opposite sides of the rising soap film is substantially equalized, which substantially eliminates diffusion of the gas therethrough during the flow rate measurement.

The distance between the region adjacent the gas inlet portion where the soap film is formed and the sensor assembly is adjusted by simply sliding the first leg of the tube upwardly or downwardly in the recesses of the sensor block members. During motion of the U-shaped gas flow tube, the gas inlet portion is accommodated by the elongated opening in the wall member so that movement of the gas inlet portion is unrestricted.

During use, the soap film solution exits the U-shaped gas flow tube in a downward direction and cannot flow back into the sensing region.

From a process standpoint, the invention comprises a method of measuring the flow rate of the gas from a source, the method including the steps of admitting a gas into an inlet of a gas flow tube having an inlet and an outlet, introducing a soap film into the interior of the gas flow tube in a region adjacent the inlet, and permitting the entering gas to propel the soap film within the tube past a sensing region while preventing the diffusion of a heavier gas into the tube via the outlet thereof. Also from a process standpoint, the invention comprises the method of measuring the flow rate of a gas from a source, the method comprising the steps of admitting a gas into an inlet of a gas flow tube having an inlet and an outlet, introducing a soap film into the interior of the gas flow tube in a region adjacent the inlet, and permitting the entering gas to propel the soap film within the tube past a sensing region while maintaining a null pressure differential across the soap film by preventing the admission of a heavier gas into the tube via the outlet thereof.

For a fuller understanding of the nature and advantages of the invention, reference should be had to the ensuing detailed description taken in conjunction with the accompanying drawings.

BRIEF DESCRIPTION OF THE DRAWINGS

FIG. 1 is a perspective view of a preferred embodiment of an apparatus incorporating the invention;

FIG. 2 is an exploded perspective view showing the major components of the apparatus of FIG. 1;

FIG. 3 is a sectional view taken along lines III—III of FIG. 2; and

FIG. 4 is a block diagram of an electrical timing device.

DESCRIPTION OF THE PREFERRED EMBODIMENT

Turning now to the drawings, FIG. 1 is a perspective view of a soap film type gas flowmeter incorporating the invention. As seen in this Figure, the flowmeter 10 includes a support having a base portion 11 and a vertically upstanding panel 12. Panel 12 includes a plastic overlay 13 having a first cut-out 14 for a digital display, preferably a liquid crystal display 15, and a second cut-out 16 for accommodating an operator controlled switch 17 for turning on and resetting the electronic portion of the system.

The display 15, the switch 17 control elements, and the associated electronic circuitry, are all contained within a housing 18 attached to the back of panel 12.

Secured to the left portion of panel 12 is a sensor assembly 20, which adjustably holds a U-shaped glass bubble meter tube 22 mounted in the inverted attitude depicted in FIG. 1. Tube 22 is an integral hollow glass tube having a first downwardly directed leg 23 terminating in a first axially extending fluid inlet 24 and a second inlet 25 extending normal to the axis of leg 23 through an elongated slot 26 formed in panel 12. Tube 22 has a second downwardly directed leg 27 terminating in an open outlet, and a branch portion 28 which interconnects legs 23, 27. Preferably, tube 22 is fabricated by drawing a straight glass tube on a precision ground mandrel, and then forming the final U-shaped configuration using conventional glass bending techniques.

As best seen in FIG. 2, sensor assembly 20 includes a pair of sensor block members 31, 32 secured to a bracket 33 by means of threaded fasteners 34 received in screw apertures 35 formed in side walls 36 of bracket 33 and threaded into threaded apertures 37 formed in block members 31, 32. Bracket 33 is mounted to panel 12 by means of suitable fasteners, such as a pair of pop rivets 37 which pass through apertures 38 in the base portion 39 of bracket 33, the central apertures in a pair of spacer washers 40 and a pair of mounting holes 41 formed in panel 12. Bracket 33 is preferably fabricated from a slightly resilient yet rigid material, such as stainless steel.

As been seen in FIGS. 2 and 3, sensor block member 31 has a pair of inwardly extending bores 43, 44 which receive a pair of light sources, preferably infrared light emitting diodes 45, 46, mounted on one leg 47 of a flexible printed circuit 50. Sensor block member 32 has a corresponding pair of inwardly extending bores 51, 52 for receiving a pair of photo detectors 53, 54 mounted on a second leg 55 of flexible printed circuit 50. Flexible printed circuit 50 includes a back leg 57 extending across the rear portions of sensor block members 31, 32. Back leg 57 and right leg 55 join at a connector end portion 59 of flexible printed circuit 50, and connector portion 59 extends through an aperture 61 formed in portion 39 of bracket 33 and an aperture 63 formed in panel 12 so that the connectors on portion 59 can be physically attached to a connector socket (not shown) in the electronic portion of the circuitry contained in housing 18.

Removably attached to fluid inlet 24 of glass tube 22 is a rubber squeeze bulb 65 which holds the soap film solution for the device.

To assemble, bracket 33 is riveted to panel 12 with spacer washers 40 in place. Thereafter, light emitting diodes 45, 46 are manipulated into bores 43, 44, photo detectors 53, 54 are manipulated into bores 51, 52 and flexible printed circuit 50 is secured to the appropriate surfaces of sensor block members 31, 32 using a suitable adhesive. Thereafter, connector portion 59 is manipulated through apertures 61, 63 and connected to the system electronics. Next, screws 34 are inserted through apertures 35 and threaded into threaded apertures 37 formed in sensor block members 31, 32 to secure these members to bracket 33. With the sensor assembly 20 now secured to panel 12, the glass tube 22 is maneuvered into the gap between the interfaces of sensor block members 31, 32 by spreading apart side walls 36, and the leg 23 of tube 22 is manipulated into the vertically extending recesses 66, 67 formed in the inner face of each block. At the same time, gas flow inlet 26 is maneuvered through aperture 26 in panel 12.

FIG. 4 illustrates in block diagram form the timing circuit used with the preferred embodiment of the invention. As seen in this FIG., the signal outputs from photo detectors 53, 54 are individually coupled to data inputs of an elapsed time detector 67, which incorporates circuitry for sensing individual changes in the DC level output from photo detectors 53, 54 when the soap film interrupts the light path between each photo detector and its corresponding light source 45, 46. Elapsed time detector 67 also incorporates circuitry for measuring the time period between generation of these signal level changes and for displaying the result in display unit 15 in some suitable form, such as a digital display of milliliters per minute. Many types of circuits are known which are capable of forming the function of elapsed time detector 67, and the details of such circuits form no part of the invention. Preferably, unit 67 is implemented using a type 80C31 microprocessor available from Intel Corporation.

In use, bulb 65 is removed from inlet 24, is filled to an appropriate level with a soap film solution and reinstalled on inlet 24. Next, the position of tube 22 is adjusted within sensor assembly 20 to a suitable relative height. Generally speaking, for faster anticipated flow rates (e.g., 125 ml per minute or greater), the tube should be manipulated to its lowest position on panel 12 at which gas flow inlet 25 is at the bottom of aperture 26. For relatively slow flow rates, tube 22 should be manipulated to its highest position on panel 12 at which gas flow inlet 26 is at the upper limit of aperture 26. For intermediate flow rates, tube 22 should be maneuvered to an intermediate position. Next, the gas flow inlet 25 is coupled to the gas flow source by means of a suitable flexible coupling, such as a rubber hose of suitable inner diameter. Since the unit is designed to be operated with a completely wet tube 22, the operator next gently squeezes bulb 65 to generate enough soap film bubbles to adequately wet the interior surfaces of tube 22. A container should also be placed below the open outlet of leg 27 to capture exiting soap film solution.

Next, the unit is activated by pressing the on/reset button 17 momentarily. Thereafter, the operator gently squeezes rubber bulb 65 to generate individual soap film bubbles. At low flow rates, the rubber bulb should be released while the film bubbles are being timed through the sensor assembly 20. At high flow rates (e.g., above 350 ml per minute), the bulb 65 should be squeezed to release short bursts of film bubbles with constant finger pressure on the bulb 65.

As each film bubble transits up leg 23 of tube 22, it reaches the sensing region and initially passes between source 45 and detector 53, thereby changing the level of the output signal from photo detector 53. As the bulb continues to transit upwardly in leg 23 of tube 22, it passes between source 46 and detector 54, to change the level of the output signal from detector 54. These changes in the output signal levels from detectors 53, 54 are sensed by elapsed time detector 67, which calculates the flow rate and displays the result on display 15.

The inverted position of tube 22 affords two significant advantages to flowmeters constructed according to the invention. Firstly, due to the downwardly reentrant attitude of tube 22, the exiting soap film solution passes downwardly and outwardly of tube 22 and cannot flow back to the sensor assembly 20. This eliminates false readings due to downwardly descending soap film solution on the inside or the outside of tube 22. In addition, for lighter than air (or ambient) gases flowing into tube 22, the entire internal volume of tube 22 is filled by this inlet gas and the heavier air cannot diffuse upwardly of leg 27 across branch 28 and down leg 23 into the sensor area and below. This eliminates the problem of diffusion of the lighter gas through the soap film as it travels from the gas flow inlet 25 to the sensor assembly 20, which in turn ensures that the soap film transits across the sensing region at the same rate as the gas. Consequently, erroneous flow readings due to diffusion of a lighter gas through the soap film are eliminated.

The relatively simple adjustment afforded for the vertical height of tube 22 also enables the flowmeter to be adjusted in such a manner to facilitate the measurements obtained. Specifically, as noted above, for relatively low gas flow rates, the tube 22 is manipulated to the upper position, so that the transit time of the soap film from the inlet region to the sensing region is minimized; while, for relatively high gas flow rates, manipulation of tube 22 to the lower most position ensures that accurate readings are obtained for bubbles which transit upwardly at a relatively high speed.

Another significant advantage of the invention lies in the preferred use of glass tubing drawn on a precision ground mandrel for bubble meter tube 22. By employing such precision drawn tubing, tube 22 is interchangeable with any flowmeter originally manufactured for use with a tube of a given type. Thus, when a tube is damaged or broken, the flowmeter can still be used so long as an undamaged tube is available from another meter. Further, a replacement tube can be obtained from the manufacturer and installed without the need for shipping the flowmeter back to the manufacturer for re-calibration. Actual tubes 22 have been fabricated to a tolerance of ±0.01 mm. for an inner diameter of 7 mm. (about 0.15 percent), and such tubes have been found to perform to an accuracy of ±3% in a National Bureau of Standards traceability test.

With respect to the uniformity of the tube inner diameter, it is noted that the critical sections of the tube 22 are: first, leg 23 which provides the fluid path for the soap bubble; and second, leg 27 which provides the exit path for the gas. The inner diameter of branch portion 28 is not critical, but should be reasonably matched to the inner diameter of lesg 23 and 27.

Finally, the term precision ground mandrel as used herein is intended to mean a mandrel ground to a tolerance sufficient to produce a glass tube with inner diameter tolerance as noted above.

While the above provides a full and complete disclosure of the preferred embodiment of the invention, various modifications, alternate constructions and equivalents may be employed without departing from the true spirit and scope of the invention. For example, while specific values have been given for the inner diameter of tube 22 and for relatively fast and relatively slow gas flow rates, it is understood that these values are by way of example only. Therefore, the above description and illustrations should not be construed as limiting the scope of the invention which is defined by the appended claims.

What is claimed is:

1. In a gas flowmeter for measuring the flow rate of a gas, the flowmeter having a gas flow tube with an inlet for connection to a gas flow source and an outlet, means for introducing a soap film adjacent said inlet, and means for detecting the rate of passage of a soap film within said tube between a pair of measuring location; the improvement wherein said gas flow tube includes means for substantially equalizing the pressure on opposite sides of the soap film within said tube in the region between said inlet and said detecting means to minimize the diffusion of the gas through the soap film during flow rate measurement, said pressure equalizing means comprising a U-shaped gas flow tube mounted in an inverted attitude, said U-shaped gas flow tube having first and second leg portions, said first leg portion including the gas flow inlet and having a length sufficiently great to span the pair of measuring locations, said second leg portion including the outlet.

2. The invention of claim 1 wherein said gas flow tube is fabricated from a glass tube drawn on a precision ground mandrel.

3. A gas flow measuring apparatus comprising:
a wall member;
sensor means carried by said wall member and having a sensing region;
a gas flow tube having a first portion thereof operatively associated with said sensor means, said tube having a gas flow inlet adapted t be coupled to a gas flow source, and an outlet; and
means for introducing a soap film into said tube adjacent said inlet whereby a soap film introduced into said tube is carried by a gas introduced into said inlet upwardly past said sensing region and through said outlet, said tube further having an inverted U-shaped configuration for substantially equalizing the pressure on opposite sides of the soap film in the region between said inlet and said sensing region to minimize the diffusion of the gas through the soap film during flow rate measurement.

4. The invention of claim 3 wherein said wall member has an elongated opening, and wherein said gas flow inlet extends through said elongated opening.

5. The invention of claim 3 wherein said tube is fabricated from a glass tube drawn on a precision ground mandrel.

6. A gas flow measuring apparatus comprising:
a wall member having an elongated opening;
a sensor assembly carried by said wall member, said sensor assembly including a U-shaped support bracket and a pair of sensor block members secured to said support bracket in facing relation to provide a space therebetween, each of said pair of sensor block members having an inner surface with a vertically extending recess;
a U-shaped gas flow tube having a first downwardly directed leg adjustably received in the vertically extending recess of each of said pair of sensor block members, a second downwardly directed leg terminating in an open outlet, and a branch interconnecting said first and second legs, said flow tube being adjustably mounted to said sensor assembly in an inverted attitude, said first downwardly directed leg having a gas inlet portion extending through said elongated opening of said wall member and a fluid inlet portion adjacent said gas inlet portion; and
means coupled to the fluid inlet portion of said first leg for introducing a soap film into said first leg in the region adjacent said gas inlet portion so that a soap film introduced into said first leg is swept upwardly along said first leg past said pair of sensor block members, along said branch and downwardly along said second leg to said outlet, the inverted attitude of said U-shaped gas flow tube serving to retain lighter than air gases in the interior thereof wherein the pressure on opposite sides of the soap film is substantially equalized to minimize diffusion of the gas therethrough during flow rate measurement.

7. The invention of claim 6 wherein said tube is fabricated from a glass tube drawn on a precision ground mandrel.

8. For use with a gas flowmeter having a sensor device for measuring the transit of a soap film bubble past a sensing region located in said sensor device, a glass bubble meter tube having a U-shaped configuration and adapted to be mounted in an inverted attitude with respect to said gas flowmeter, said tube having a first leg provided with a gas flow inlet and a soap film inlet, a second leg spaced from and essentially parallel to said first leg and terminating in a gas flow outlet, and a branch portion interconnecting said first and second legs, said first leg having a length sufficiently great to span said sensing region, said tube providing pressure equalization on opposite sides of a soap film travelling within said tube through said sensing region.

9. The invention of claim 8 wherein said tube is fabricated from a glass tube drawn on a precision ground mandrel.

10. The invention of claim 8 wherein at least said first leg has an inner diameter with a dimensional accuracy of about 0.15 percent referenced to the desired inner diameter value.

11. A gas flow measuring apparatus comprising:
a wall member;
sensor means carried by said wall member and having a sensing region with a plurality of sensor devices;
a gas flow tube having a first portion thereof operatively associated with said sensor means, said tube having a gas flow inlet adapted to be coupled to a gas flow source, and an outlet;
means for adjustably supporting said gas flow tube relative to said sensor means so that the distance between said inlet and said sensing region can be varied without affecting the relative positions of said sensor devices; and
means for introducing a soap film into said tube adjacent said inlet whereby a soap film introduced into said tube is carried by a gas introduced into said inlet upwardly past said sensing region and through said outlet.

12. The invention of claim 11 wherein said wall member has an elongated opening, and wherein said gas flow inlet extends through said elongated opening.

* * * * *